US009670888B2

(12) United States Patent
Jiang et al.

(10) Patent No.: US 9,670,888 B2
(45) Date of Patent: *Jun. 6, 2017

(54) REPLACEABLE FILTER ELEMENTS INCLUDING PLURAL FILTER MEDIA AND RELATED FILTRATION SYSTEMS, TECHNIQUES AND METHODS

(71) Applicant: CUMMINS FILTRATION IP, INC., Minneapolis, MN (US)

(72) Inventors: Zemin Jiang, Cookeville, TN (US); Melvin Douglas McCormick, Cookeville, TN (US); David P. Genter, Columbus, IN (US); Norman C. Blizard, Columbus, IN (US); Jeffrey A. Husband, Cookeville, TN (US); Michael J. Connor, Stoughton, WI (US); Wassem Abdalla, Cookeville, TN (US); Barry M. Verdegan, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/018,687

(22) Filed: Sep. 5, 2013

(65) Prior Publication Data

US 2014/0008286 A1  Jan. 9, 2014

Related U.S. Application Data

(60) Continuation of application No. 12/486,465, filed on Jun. 17, 2009, which is a division of application No.

(Continued)

(51) Int. Cl.
*B01D 27/14* (2006.01)
*F02M 37/22* (2006.01)
(Continued)

(52) U.S. Cl.
CPC ........... *F02M 37/221* (2013.01); *B01D 27/06* (2013.01); *B01D 36/003* (2013.01); *B01D 2201/298* (2013.01); *Y10S 210/05* (2013.01)

(58) Field of Classification Search
CPC  B01D 27/06; B01D 27/148; B01D 2201/298; B01D 36/003; F02M 37/221
(Continued)

(56) References Cited

U.S. PATENT DOCUMENTS 3,228,527 A    1/1966  McPherson
3,390,780 A *  7/1968  Bennett .................... 210/338
(Continued)

*Primary Examiner* — Madeline Gonzalez
(74) *Attorney, Agent, or Firm* — Foley & Lardner LLP

(57) ABSTRACT

One embodiment is a filter element including an outer filter media and an inner filter media. The outer filter media is operable to remove particulates present in a flow of fluid and/or coalesce water contained in the flow of fluid. The inner filter media is operable to remove particulates from the flow of fluid, separate water form the flow of fluid, and remove particulates from the flow of fluid. Other embodiments include unique apparatus, devices, systems, and methods relating to fuel filters and filtration. Further embodiments, forms, objects, features, advantages, aspects, and benefits of the present application shall become apparent from the detailed description and figures included herewith.

16 Claims, 9 Drawing Sheets

Related U.S. Application Data

11/890,816, filed on Aug. 8, 2007, now Pat. No. 7,887,704, which is a continuation of application No. PCT/US2007/014397, filed on Jun. 20, 2007.

(60) Provisional application No. 60/815,118, filed on Jun. 20, 2006, provisional application No. 60/880,145, filed on Jan. 12, 2007.

(51) Int. Cl.
*B01D 27/06* (2006.01)
*B01D 36/00* (2006.01)
*B01D 27/00* (2006.01)

(58) Field of Classification Search
USPC ....... 210/338, 342, DIG. 5, 315, 493.2, 450, 210/455, 445, 451
See application file for complete search history.

(56) References Cited

U.S. PATENT DOCUMENTS

| | | | |
|---|---|---|---|
| 3,802,160 A | 4/1974 | Foltz | |
| 4,233,042 A | 11/1980 | Tao | |
| 4,253,954 A | 3/1981 | Midkiff et al. | |
| 4,299,699 A | 11/1981 | Boogay | |
| 4,477,345 A | 10/1984 | Szlaga, Jr. | |
| 4,995,974 A | 2/1991 | Lorey et al. | |
| 5,078,877 A | 1/1992 | Cudaback et al. | |
| 5,084,170 A | 1/1992 | Janik et al. | |
| 5,342,511 A | 8/1994 | Brown et al. | |
| 5,458,767 A | 10/1995 | Stone | |
| 5,888,383 A | 3/1999 | Cox | |
| 6,068,762 A | 5/2000 | Stone et al. | |
| 6,165,572 A | 12/2000 | Kahlbaugh et al. | |
| 6,171,684 B1 | 1/2001 | Kahlbaugh et al. | |
| 6,174,438 B1 | 1/2001 | Hodgkins et al. | |
| 6,235,194 B1 | 5/2001 | Jousset | |
| 6,361,684 B1 | 3/2002 | Hawkins et al. | |
| 6,478,958 B1 * | 11/2002 | Beard et al. | 210/323.2 |
| 6,500,338 B2 | 12/2002 | Baah | |
| 6,569,330 B1 | 5/2003 | Sprenger et al. | |
| 6,692,639 B1 | 2/2004 | Spearman et al. | |
| 6,716,349 B2 | 4/2004 | Baracchi et al. | |
| 6,872,431 B2 | 3/2005 | Kahlbaugh et al. | |
| 6,939,464 B1 | 9/2005 | Jiang et al. | |
| 7,887,704 B2 * | 2/2011 | Jiang et al. | 210/338 |
| 8,440,083 B2 * | 5/2013 | Jiang et al. | 210/338 |
| 2002/0162781 A1 | 11/2002 | Demirdogen | |
| 2003/0070978 A1 | 4/2003 | Baracchi et al. | |
| 2004/0206682 A1 | 10/2004 | Hamlin et al. | |
| 2006/0163146 A1 | 7/2006 | Girondi | |
| 2009/0250402 A1 | 10/2009 | Jiang et al. | |

* cited by examiner

REPLACEABLE FILTER ELEMENTS INCLUDING PLURAL FILTER MEDIA AND RELATED FILTRATION SYSTEMS, TECHNIQUES AND METHODS

PRIORITY

The present application is a Divisional of U.S. application Ser. No. 11/890,816 filed Aug. 8, 2007, which is a Continuation of International Application Number PCT/US2007/014397 the International Filing Date of which is Jun. 20, 2007, which claims the benefit of priority of U.S. Application No. 60/815,118 filed Jun. 20, 2006 and U.S. Application No. 60/880,145 filed Jan. 12, 2007. All of the aforementioned applications are hereby incorporated by reference in their entirety.

TECHNICAL FIELD

The technical field related generally to fluid filters and to methods and systems of removing unwanted particulates and/or water from fluid with one or more filters

BACKGROUND

Fuel injection systems for internal combustion engines, such as high pressure common rail fuel injection systems for diesel engines are vulnerable to fuel contaminants, including particulates on the order of 4-6 microns and others such as larger and smaller particulates of various phases and compositions which may be present in fuel. There is an unmet need to reduce or eliminate these and other fuel contaminants.

SUMMARY

One embodiment is a filter element including an outer filter media and an inner filter media. The outer filter media is operable to remove a majority of the particulates present in a flow of fluid. The inner filter element is operable to remove finer particulates from the flow of fluid that pass through the outer filter media. In addition, the outer and inner filter media comprises a multilayered filter media. Other embodiments include unique apparatus, devices, systems, and methods relating to fuel filters and filtration. Further embodiments, forms, objects, features, advantages, aspects, and benefits of the present application shall become apparent from the detailed description and figures included herewith.

DETAILED DESCRIPTION

Figure 1:
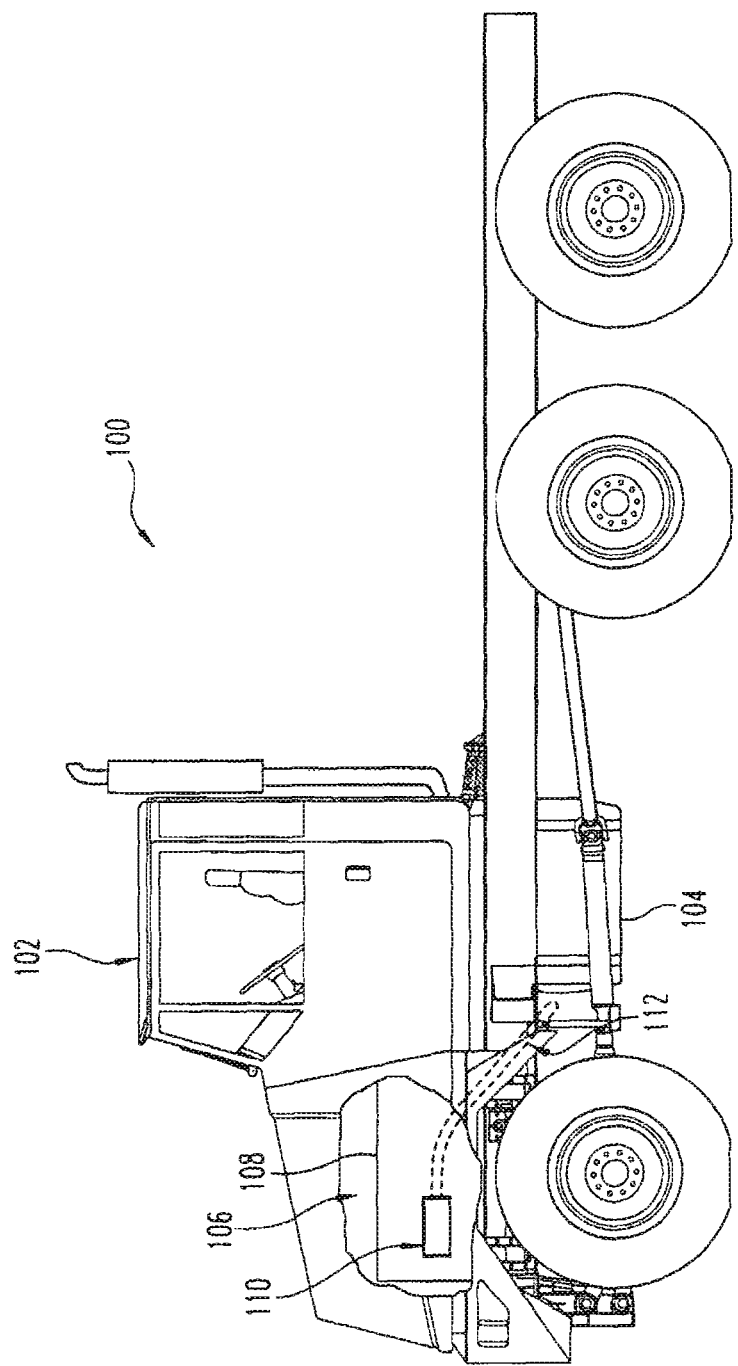
FIG. 1 is a side view of a vehicle including an internal combustion engine system having a fueling system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1 there is illustrated an exemplary vehicle 100 including a passenger/operator cabin 102. As illustrated in FIG. 1, vehicle 100 is a semi-tractor, but could alternatively be any of a variety of other vehicles, such as a light, medium, or heavy duty truck, bus, car, sport utility vehicle, motor coach, or farm or industrial equipment, for example. In other embodiments, vehicle 100 could be a marine or aircraft vehicle. Vehicle 102 includes a fuel tank 104 and power/propulsion 106 that includes an engine 108. Additionally, system 106 includes a fueling system 110 coupled to a fuel tank 104 for providing fuel to engine 108. A fluid conduit, pipe 112, or other flow passage couples fuel tank 104 to fueling system 110. Engine 108 is preferably a reciprocating piston type that is configured for compression ignition and direct injection or port-injected diesel fueling. In other embodiments engine 108 could be another type of engine, or power plant.

Figure 2:
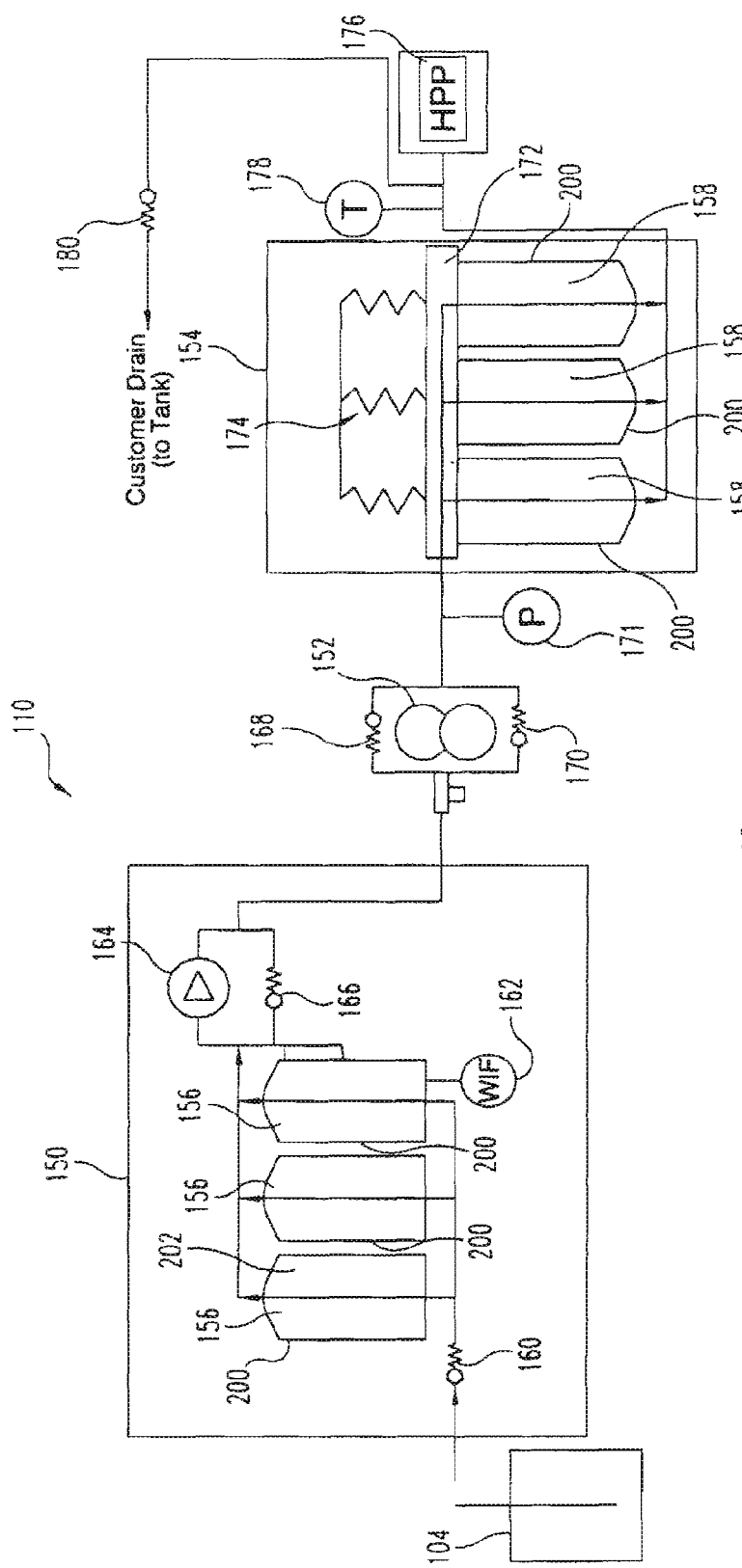
FIG. 2 is a diagram of a representative fueling system.

Referring to FIG. 2, fueling system 110 includes a first liquid filtering subsystem 150, a fluid or fuel pump 152, and a second liquid filtering subsystem 154. The first liquid filtering subsystem 150 is positioned on the suction side of the fuel pump 152, and the second liquid filtering subsystem 154 is positioned on the pressure side of the fuel pump 152. Filtering subsystems 150, 154 provide clean, filtered fuel that prevents pump wear, injector clogging, premature engine wear and can boost fuel efficiency. The first liquid filtering subsystem 150 includes a first set of filter assemblies 156 and the second liquid filtering subsystem 154 includes a second set of filter assemblies 158. It should be appreciated that system 110, and subsystems 150, 154 are exemplary, and that a variety of other systems and subsystems are contemplated in various embodiments. In some embodiments, only one filter subsystems 150, 154 having one filter in filter disclosed herein may be used.

The fuel tank 104 is in fluid communication with the first liquid filtering subsystem 150. A check valve 160 is preferably positioned in the fluid path between the fuel tank 104 and the filter assemblies 156. Check valve 160 prevents fuel from flowing back into fuel tank 104 once it leaves fuel tank 104 and enters the first liquid filtering subsystem 150. The first filtering subsystem 150 is positioned on the suction side of the fuel pump 152. Filter assemblies 156 are capable of removing contaminates from the fuel before they enter pump 152. The filter assemblies 156 are connected in a parallel fluid flow path configuration. Although illustrated in a parallel fluid flow path configuration, in alternative arrangements, the filter assemblies 156 could be connected in a series flow path configuration.

Fuel that is provided to engine 108 by fuel system 110 typically includes some undesirable constituents or contaminants. Such constituents typically include particulate matter, water, microorganisms and/or other types of contaminates. To remove these constituents, liquid filter assemblies 150, 154 are included in the fuel system 110. As set forth in detail below, filter assemblies 156, 158 include a housing 200 defining an interior space 202 for receipt of fuel and at least one filter element 250 (See FIG. 3) positioned within interior space 202 for filtering constituents from the fuel. Filter elements 250 disclosed herein may be used in various systems including, but not limited to, that disclosed in U.S. Pat. No. 6,939,464, which is hereby incorporated by reference in its entirety.

At least one filter assembly 156 may include a water-in-fuel ("WIF") sensor 162. WIF sensor 162 is positioned in a lower portion of filter assembly 156 and is used to detect water that is separated from fuel by at least one filter assembly such as assembly 156. After a predetermined amount of water is collected by filter assembly 156, WIF sensor 162 generates a signal that is sent to an engine control unit (not illustrated). The engine control unit may then generate a signal, such as lighting a warning lamp in the cab of vehicle 100, that indicates that filter assembly 156 either needs to be changed, serviced, or drained. In an alternative embodiment, filter assembly 156 automatically drains collected water from filter assembly 156.

The first filtering subassembly 150 also includes an electric priming and starting assist pump 164 in fluid communication with filter assemblies 156. Priming and starting assist pump 164 is positioned between the input to fuel pump 152 and the output of filter assemblies 156. Priming and starting assist pump 164 is used to help prime and start engine 108 by supplying fuel during engine startup. A check valve 166 is in fluid communication between the input to priming and starting assist pump 164 and the output of priming and starting assist pump 164 as illustrated. The check valve 166 prevents fuel from re-entering filter assemblies 156 through the output of filter assemblies 156 when engine 108 is not running.

Fuel pump 152 is in fluid communication with a first and second check valve 168, 170. First check valve 168 can be used to release fuel back into the suction side of fuel pump 152 if the pressure rises above a predetermined level. Second check valve 170 can be used to prevent fuel from leaving or exiting the second filtering subsystem 154 if engine 108 is not running. Several different types of fuel pumps may be utilized in different embodiments. A pressure sensor 171 is located downstream of the output of fuel pump 152 before the input of the second filtering subassembly 154. The pressure sensor 171 monitors the pressure of the fuel as it exits fuel pump 152 and generates a signal indicative thereof that is sent to the engine control unit.

The output of fuel pump 152, often referred to as the pressure side, is in fluid communication with an input of the second filtering subassembly 154. The second filtering subassembly 154 is preferably designed to endure higher pressures than the first filtering subassembly 150. The first and second filtering subassembly 154 provides particulate filtration and is capable of removing water from the fuel in some embodiments. The second filtering subassembly 154 may include a frame portion 172 that securely holds housings 200 of filter assemblies 158 to vehicle 102. In one form, second filtering subassembly 154 may be placed in an engine vibration isolation system 174 of the type disclosed in U.S. Provisional Patent Application Ser. No. 60/744,895, filed Apr. 14, 2006, entitled Vibration Isolated Fuel Filter Head, the disclosure of which is hereby incorporated by reference in its entirety. As set forth therein, the engine vibration isolation system 174 substantially reduces or eliminates vibrations that may adversely affect operation of the second filtering subassembly 154.

After exiting the second filtering subassembly 154, the fuel enters a high pressure common rail system 176 which supplies fuel to engine 108. A temperature sensor 178 is included in fluid communication with the outlet of the second filtering subassembly 154. Temperature sensor 178 is used to measure the temperature of the fuel before it enters the common rail system 176. A check valve 180 is included in fluid communication with the outlet of the second filtering subassembly 154. Check valve 180 is set to release fuel if the pressure in the fuel line rises above a predetermined level. The fuel that is released by the check valve is returned to fuel tank 104. Although the filters and filter elements disclosed herein are described in connection with filtering fuel, it should be appreciated that other types of fluid, such as lubricants for example, could also be filtered by the filters and filter elements.

Figure 3:
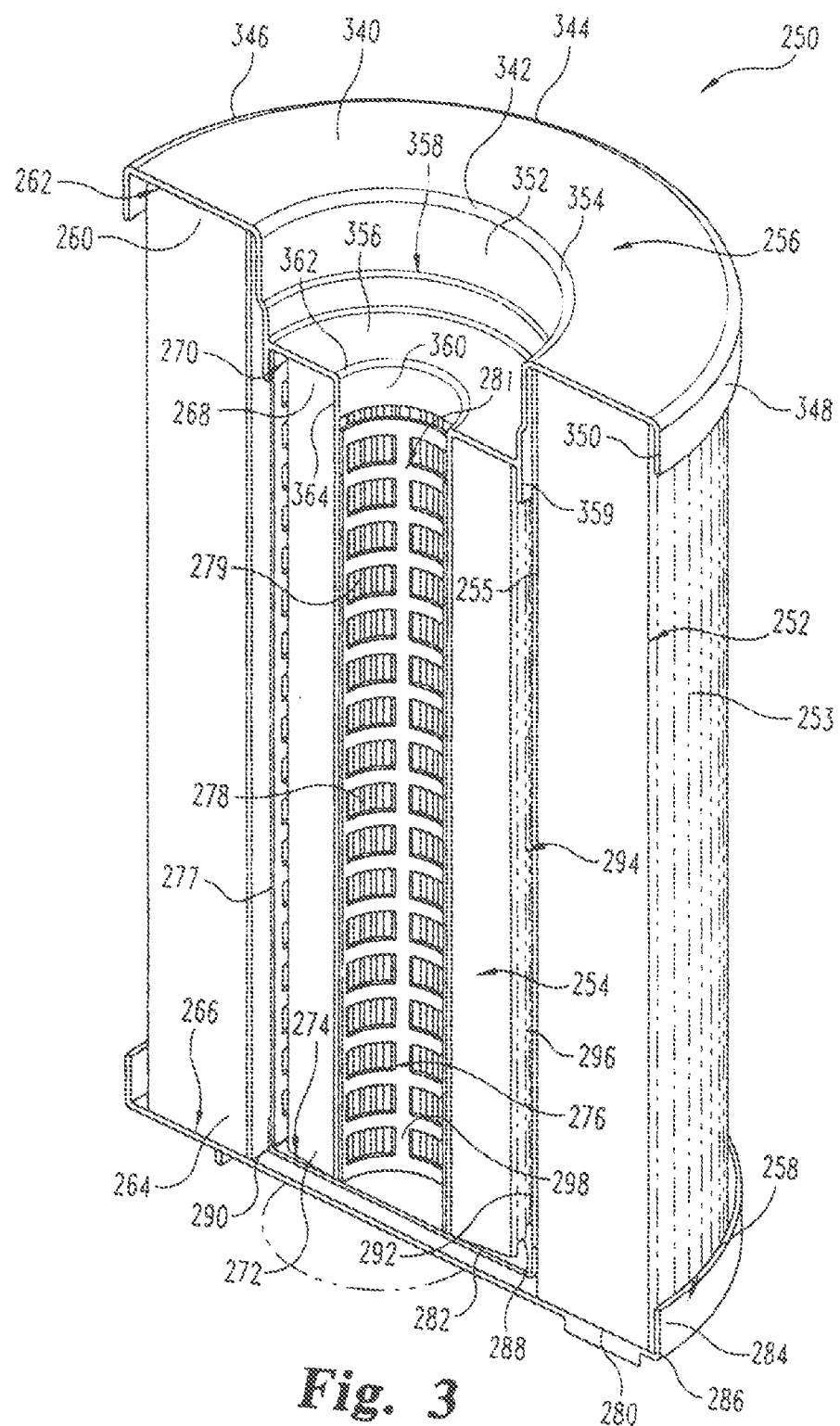
FIG. 3 is a cross-sectional view of a representative filter element or cartridge.

With reference to FIG. 3, there is illustrated a representative replaceable filter element or cartridge 250 that is housed or positioned within housing 200 of the first and/or second filtering subassembly 150, 154 set forth in FIG. 2. Filter element 250 includes a first or outer filter media stage 252 and a second or inner filter media stage 254 radially spaced apart from outer filter media stage 252. Outer and inner filter media stages 252, 254 extend vertically between an upper end plate 256 and a lower end plate 258. As illustrated, outer filter media stage 252 has a vertical length longer than that of inner filter media stage 254. In one form, outer filter media stage 252 and inner filter media stage 254 comprise a multi-layer filter media. Using a multi-layer filter media improves particle filtration efficiency.

According to a preferred embodiment, an upper portion 260 of outer filter media stage 252 is fixedly secured to a lower surface 262 of upper end cap 256 and a lower portion 264 of outer filter media stage 252 is fixedly secured to a lower surface 266 of lower end cap 258. Likewise, an upper portion 268 of inner filter media stage 254 is fixedly secured to a second lower surface 270 of upper end cap 256 and a lower portion 272 of inner filter media stage 254 is fixedly secured to a second lower surface 274 of lower end cap 258. The length or height of inner filter media stage 254 is smaller than the length or height of outer filter media stage 252.

Outer filter media stage 252, inner filter media stage 254, upper end cap 256, and lower end cap 258 are generally cylindrical in shape, but other shapes are envisioned. Outer and inner filter media stages 252, 254 may be fixed to the end caps 256, 258 in a variety of ways including, but not limited to, embedding, potting with adhesive, or sonic, or thermal welding. A centertube 276 may be coupled to an inside diameter 278 of inner filter media stage 254. Centertube 276 runs along the length of inner filter media stage 254, but could be shorter than the length of inner filter media stage 254. Centertube 276 includes a plurality of apertures 279 that allow fluid to flow into an inner fluid chamber 281 defined by centertube 276. An inner surface area of outer filter media stage 252 may also be aligned or connected with a second centertube 277 substantially designed the same as first centertube 276. In alternative forms, centertube 276 may not be included.

Lower end cap 258 includes a lower base portion 280 and an upper base portion 282. Lower portion 264 of outer filter media stage 252 is secured to lower base portion 280 of lower end cap 258. A lower portion 272 of inner filter media stage 254 is secured to upper base portion 282 of lower end cap 258. Lower base portion 280 includes an outer flange 284 that protrudes upwardly from an outer edge 286 of lower end cap 258. Upper base portion 282 of lower end cap 258 includes a second outer flange 288 that also protrudes upwardly a short distance from an outer edge 290 of upper base portion 282. Second outer flange 288 keeps inner filter media stage 254 separated from outer filter media stage 252 such that a gap 294 is formed between the two respective filter media stages 252, 254. Lower end cap 258 may be manufactured as one piece or two pieces.

In one form, outer and inner filter media stages 252, 254 are formed using a material that is selected to remove one or more undesirable constituents or particulates by trapping or containing them relative to filtered fuel downstream of such material. Further, outer and inner filter media stages 252, 254 are preferentially formed from multiple layers of particulate trapping material. As such, outer and inner filter media stages 252, 254 comprise a multi-layered filter media. In another form, inner and outer filter media stages 252, 254 comprise a melt blown media, an air-laid media, a wet-laid media, a woven media, or a non-woven media, a membrane media or a synthetic blend of one or more of the media types.

Outer filter media stage 252 is a multi-layered filter media stage that is operable to remove or capture unwanted contaminates or particulates from a flow of fuel. Outer filter media stage 252 may be larger or thicker than inner filter media stage 254 and is designed such that, during operation, it is responsible for capturing a majority of the unwanted particulates. In particular, in one form, outer filter media stage 252 is designed to capture larger particulates contained in the flow of fuel. Inner filter media stage 254 is also operable to remove or capture unwanted contaminates or particulates from the flow of fuel. In one form, inner filter media stage 254 contains multiple layers of filtering media that are designed to remove smaller contaminates or particulates that may not be captured or removed by outer filter media stage 252. As such, in one form, outer filter media stage 252 removes a majority of the contaminants by capturing the larger sized particles and inner filter media stage 254 removes finer contaminates that may pass through outer filter media stage 252.

In another form, outer filter media stage 252 comprises a coalescing filter media operable to coalesce smaller water droplets into larger water droplets. Outer filter media stage 252 is designed to withstand high pressures and to merge water droplets contained in fluid passing therethrough by using a coalescing medium as the filter media. The coalescing filter media causes free water and emulsified water contained in the fuel to form into larger droplets. Outer filter media stage 252 preferably utilizes the practice of liquid to liquid coalescence to merge any water contained therein into larger water droplets. Fuel tends to rise and water droplets fall, thereby providing clean fuel to engine 108. The coalescing filter media may be based on cellulose, cellulose/glass composite, meltblown media, airlaid media, wetlaid media, woven media, non-woven media, membrane media or a synthetic blend of one or more of the aforementioned media types. It should be appreciated that outer filter media stage 252 and inner filter media stage 254 also filter particulates from the flow of fuel.

Fuel introduced into filtering element 250 passes through an outer surface 253 of outer filter media stage 252. As fuel travels through outer filter media stage 252 water droplets are combined, preferably by coalescing, to become larger water droplets. In addition, contaminates in the fuel are also captured by outer filter media stage 252. As the fuel and water droplets exit through an inner surface area 255 of outer filter media stage 252, the water droplets separate from the fuel and flow downwardly toward the bottom of filter element 250. Fuel or fluid continues to flow to inner filter media stage 254 and the water settles or flows downwardly to the bottom of gap 294.

In one form, the lower end plate 258 includes apertures or passages that allow the water to flow out of filtering element 250. A gap 294 exists between outer filter media stage 252 and inner filter media stage 254 that assists in separation of water from the fuel by allowing particles to further coalesce, for example due to inter-particle forces and interactions, and other forces such as gravity and interaction with other surfaces. In one form, the outer coalescing filter media 252 comprises a multi-layer filter media.

In another form, inner filter media stage 254 comprises a water adsorbing, a water separating or a water coalescing media that removes, adsorbs or separates any water droplets that may not flow to the lower surface of gap 294 from the flow of fuel. In addition, inner filter media stage 254 comprises a particulate filtering media capable of removing particulates from the flow of fluid or fuel. As fluid passes through inner filter media stage 254, the water absorbing media captures the water droplets thereby removing them from the flow of fuel, for example by wicking or by surface flow or by a combination or these and/or other modes. In one form, the outer surface of filter media stage 254 may be coated with or contain a water repellant or may be hydrophobic, which further causes water to move through gap 294 toward the bottom of the filtering element 250. As such, it should be appreciated that outer filter media stage 252 can cause water droplets to be coalesced out of the fuel stream.

The water droplets move toward a lower surface of filter element 250 and the fuel passes on through inner filter media stage 254. In another form, the separator may have a hydrophobic outer surface of filter media stage 254 with at least one downstream absorbing layer, such as a layer of filter media containing a water absorbent polymer or like material. In this form, water passing through the hydrophobic outer surface of filter media stage 254 will be adsorbed by the water absorbing layer, causing it to swell and increase the restriction across the filter. When the amount of water and corresponding pressure drop becomes to high, flow to the engine is restricted and the engine ceases to run, thus protecting the engine from the detrimental effects of water. In another form, the in filter media 254 comprises a multi-layer filter media that comprises multiple layers of filtering media combined together to form water separating media 254. In another form, the inner filter media 254 comprises a multi-layer filter media that comprises multiple layers of filtering media combined together to form water separating media 254 to capture water droplets that pass through the outer filter media stage 252 and gap 294 and coalesce them into larger drops that can be removed by settling or downstream separator 254. In this case, the outer surface of filter media stage 254 may be hydrophobic to further cause large water droplets to move through gap 294 toward the bottom of the filtering element 250 and be followed by subsequent hydrophobic or hydrophilic layers to enhance coalescence.

In yet another representative form, inner filter media stage 254 comprises a coalescing filter media operable to coalesce water that may pass through outer filter media stage 252 and gap 294. As such, in this form, outer filter media stage 252 and inner filter media stage 254 comprise water coalescing stages or in other words, the filter element 250 includes dual coalescing stages. In other forms, outer filter media stage 252 may include particulate removal filter media and inner filter media stage 254 may include coalescing filter media. The coalesced water will travel downwardly and the fluid or fuel will travel upwardly before entering fluid chamber 281. As such, clean fluid or fuel free of water will enter fluid chamber 281 to be used downstream. As with the previous forms, both inner and outer filter media stages 252, 254 also capture particulates in addition to coalescing water.

All of the embodiments disclosed herein may include filter media stages that are operable to coalesce, adsorb water, separate water, and/or capture particulate matter. In particular, outer and inner filter media stages 252, 254, since they have multiple filter media layers, may coalesce water, adsorb the coalesced water, separate water, and capture particulates. Each layer of the filter media stages 252, 254 may be designed to perform different functions.

Figure 4:
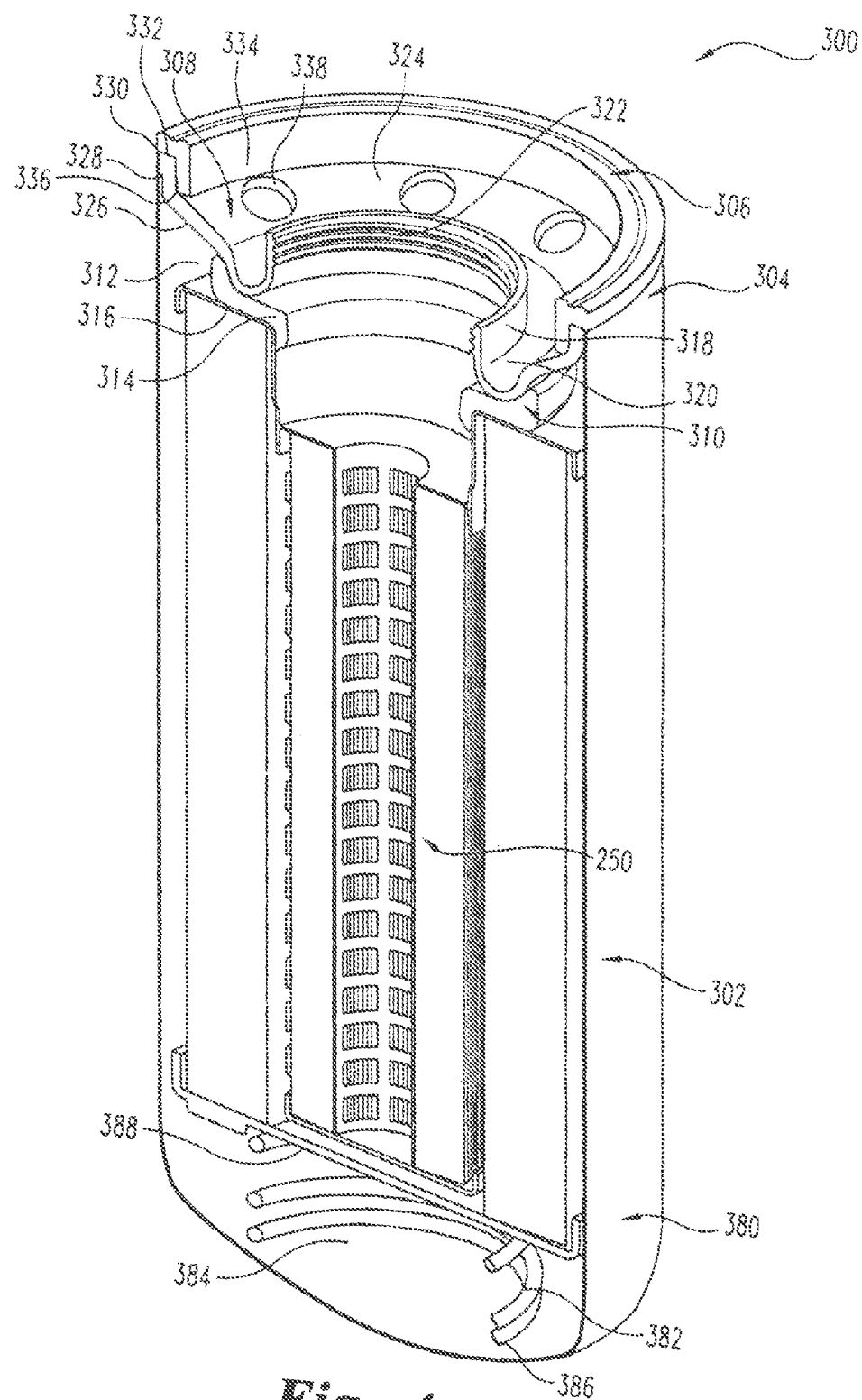
FIG. 4 is a cross-sectional view of a representative filter incorporating the filter cartridge illustrated in FIG. 3.

Referring to FIGS. 3 and 4, a filter 300 is depicted which includes filtering element 250. The filter 300 includes an outer shell or housing 302 that houses filtering element 250. An upper portion 304 of shell 302 includes an external seal 306, a nutplate 308, and an internal seal 310. Seals 306, 310 and nutplate 308 have a generally cylindrical shape. Internal seal 310 is fixedly secured to an upper surface 312 of upper end plate 256. Internal seal 310 includes an L-shaped segment 314 that mates with an L-shaped segment 316 of upper end plate 256.

Nutplate 308 includes an internal cylindrically threaded segment 318 that protrudes upwardly from a central axis of a base portion 320. Threaded segment 318 includes an internally threaded portion 322. An outer wing portion 324 of nutplate 308 extends upwardly and outwardly from base portion 320 to an internal wall 326 of shell 302. Shell 302 may comprise a permanent or disposable housing manufactured from various compositions. A flange 328 protrudes upwardly from an end of wing portion 324. An upper portion 330 of shell 302 wraps around an upper portion of flange 328 to secure shell 302 to flange 328 of wing portion 324.

External seal 306 is connected to an outer upper edge 332 of shell 302 and includes a downwardly extending segment 334 connected with an inner edge 336 of nutplate 308. The external seal 306 seals filter 300 to a respective externally threaded connector (not illustrated) in the fluid path of fueling system 110. Inner seal 310 provides a fluid tight seal between end cap 256 and nutplate 308, Wing portion 324 includes a plurality of apertures 338 that run circumferentially around the wing portion 324. During operation, fuel enters the outer filtering media stage 252 through apertures 338. Fuel then proceeds through the outer surface of outer filtering media stage 252. Fuel then exits outer filter media stage 252 and passes into gap 294 where the water droplets created by the coalescing media to move downwardly while fuel moves upwardly. Fuel then enters inner filter media stage 254 where any remaining water is preferably eliminated from the flow of fuel.

Referring back to FIG. 3, upper end cap 256 of filter element 250 includes an upper surface 340 having an inside diameter 342 and an outside diameter 344. An outer edge 346 of upper end cap 256 includes a first flange 348 that protrudes downwardly a predetermined distance from outer edge 346. The flange 348 secures a portion of an outer edge 350 of the outer filter media stage 252 within first flange 348. An internal segment 352 of upper end cap 256 extends downwardly from an inside edge 354 of upper end cap 256 to a base portion 356, preferably to form an internal connection chamber 358.

The internal segment 352 also includes a downwardly extending segment 359 that forms a flange that is secured to outer surface 296 of inner filter media stage 254. A second flange 360 is located at an inner edge 362 of base portion 356 and extends downwardly from inner edge 362. Second flange 360 holds upper portion 268 of inner filter media stage 254 in place and is connected with an inside edge 364 of inner filter media stage 254. Second flange 360 defines an aperture or opening that leads to fluid chamber 281. Outer flange 348, downwardly extending 359 segment 353, and internal flange 360 form U-shaped cradles the same as or similar to those illustrated in connection with lower end cap 258. The U-shaped cradles are fixedly secured to respective ends of filter media 252, 254 as illustrated. Although U-shaped cradles are disclosed in the preferred embodiment, the cradles may have other shapes in other embodiments.

Referring to FIGS. 5-8, in another form, upper end cap 256 includes an outer flange 400 and an upper surface 426. Flange 400 is secured to outside surface 401 of outer filter media stage 252. A base cap member 402 having a cylindrical outer wall 404 and a base 406 are connected to an upper surface 408 of inner filter media stage 254. Base cap member 402 includes an inner flange 410, and a lower portion 412 of cylindrical outer wall 404 defines an outer flange 414 that is secured to side 416 of inner filter media stage 254. Inner flange 410 defines an opening 417 to fluid chamber 281.

An upper cap member 418 having a downwardly extending flange 420, a mid-section 422 and an upwardly extending flange 424 is connected to an upper surface 426 of upper end cap 256. Downwardly extending flange 420 extends downwardly from an edge of mid-section 422 and is secured to the inside surface of an upper portion of outer wall 404 of base cap member 402. Inner end cap member 418 may be connected to upper surface 426 and outer wall 404 of base cap member 402 in a variety of ways including, but not limited to, embedding, potting with adhesive, or sonic or thermal welding. A cylindrical seal 428 is fixedly secured to a lower portion 430 of flange 420 that extends downwardly to base 406 of base cap member 402.

A nutplate 308 is connected with upper flange 424 of upper cap member 418. A lower portion 434 of outer wing 324 and a lower portion 436 of base 320 are fixedly secured to upper cap member 418. Upwardly extending flange 424 and base 320 may be connected with inner end cap member 418 in a variety of ways including, but not limited to, embedding, potting with adhesive, or thermal or sonic welding. An outer edge 438 of outer wing 324 is connected with an inner surface 441 of shell 302. The outer edge 438 positions end cap 256 such that a fluid path 440 is formed between flange 400 and shell 302. As such, during operation, fuel enters through apertures 338 of nutplate 308 and travels into a fluid chamber 442 where it is directed through fluid path 440 to outer filter media stage 252, Referring back to FIG. 4, a lower portion 380 of shell 302 includes a spring 382 that is positioned within an interior space 384 of shell 302. The spring 382 is connected with an interior surface 386 of shell 302 and a lower surface 388 of lower base portion 390. The spring 382 applies upward force to lower surface 388 of lower base portion 390 to force end plate 256 against upper cap member 418, upper cap member 418 against nutplate 308, and nutplate 308 against curved portion of shell 302. This further helps fixedly secure all of the respective components or elements together.

Figure 5:
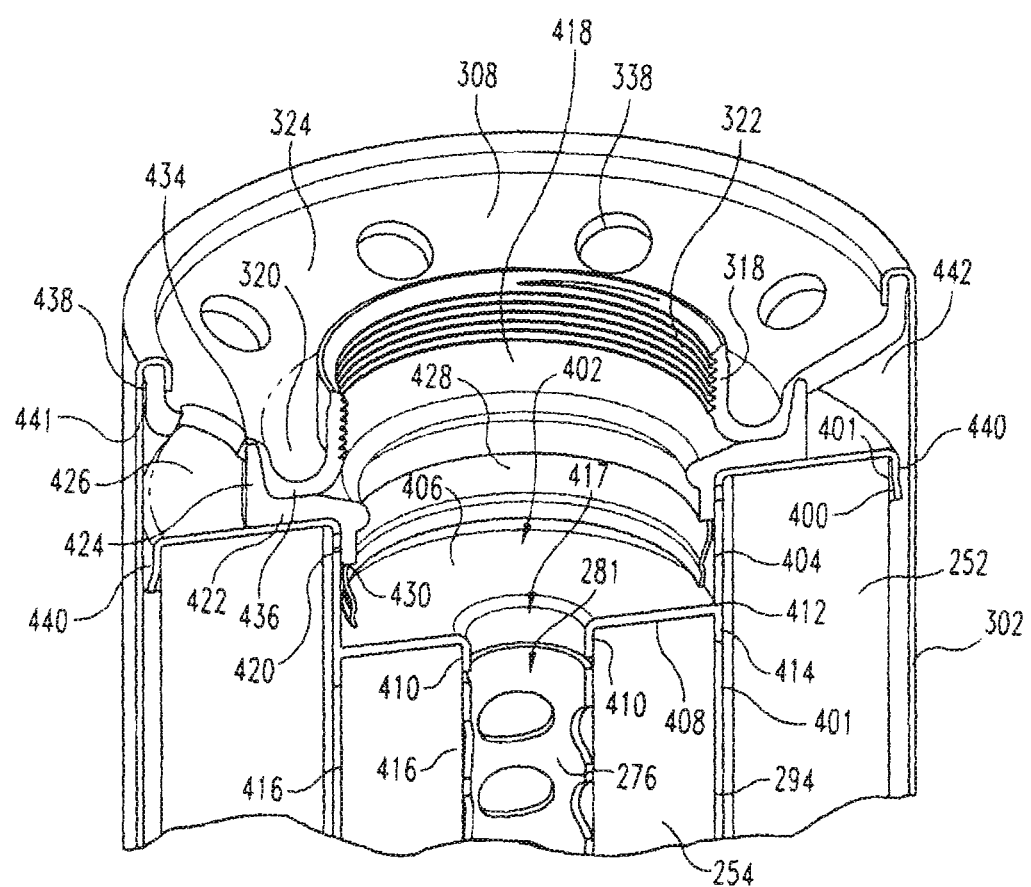
FIG. 5 is a cross-sectional view of an upper portion of a representative filter.
Figure 6:
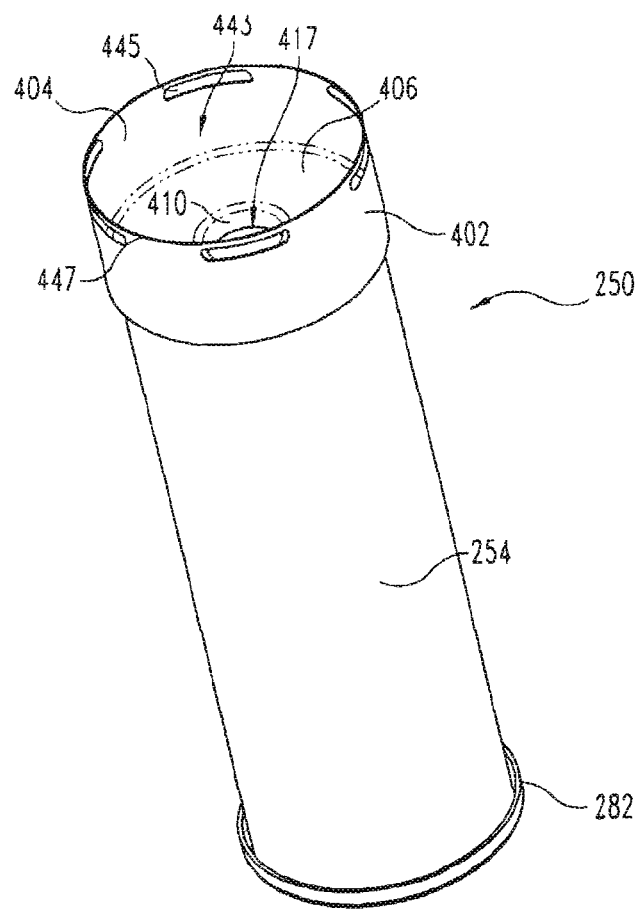
FIG. 6 is a perspective view of a portion of a filter cartridge.
Figure 7:
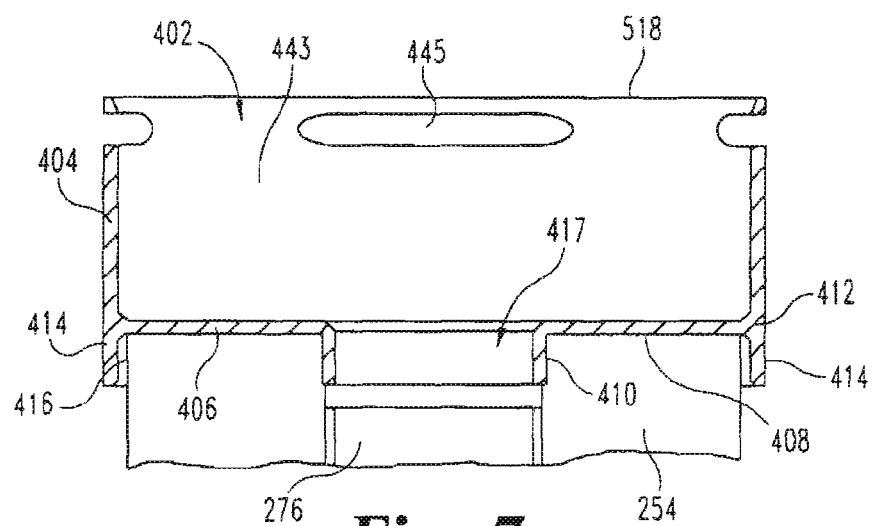
FIG. 7 is a cross-sectional view of the upper portion of the filter cartridge illustrated in FIG. 6.

Referring collectively to FIGS. 6 and 7, a portion of filtering element 250 set forth in FIG. 5 is illustrated in further detail. Base cap member 402 is connected with upper surface 408 of inner filtering media stage 254. Base cap member 402 includes opposing flanges 410, 414 that extend downwardly from the outer and inner edge of base portion 406 of base cap member 402. Base cap member 402 also includes an upwardly extending segment 404 that extends vertically upward from an outer edge 412 of base portion 406. Flange 414 secures the outer edge of inner filtering media stage 254 to base cap member 402. Base portion 406, outer flange 414, and inner flange 410 form a U-shaped cradle that secures base cap member 402 to the upper portion of inner filtering media stage 254.

Upwardly extending segment 404 of base cap member 402 defines a cylindrical upper chamber 443. Inner flange 410 of base cap member 402 defines a cylindrical lower opening 417. Base cap member 402 also includes a plurality of oval shaped apertures 445 located near an upper edge 447 of upwardly extending segment 404. As set forth below, potting material or adhesive may be placed in and around apertures 445 to secure base cap member 402 to the outer edge of outer filter media stage 252.

Figure 8:
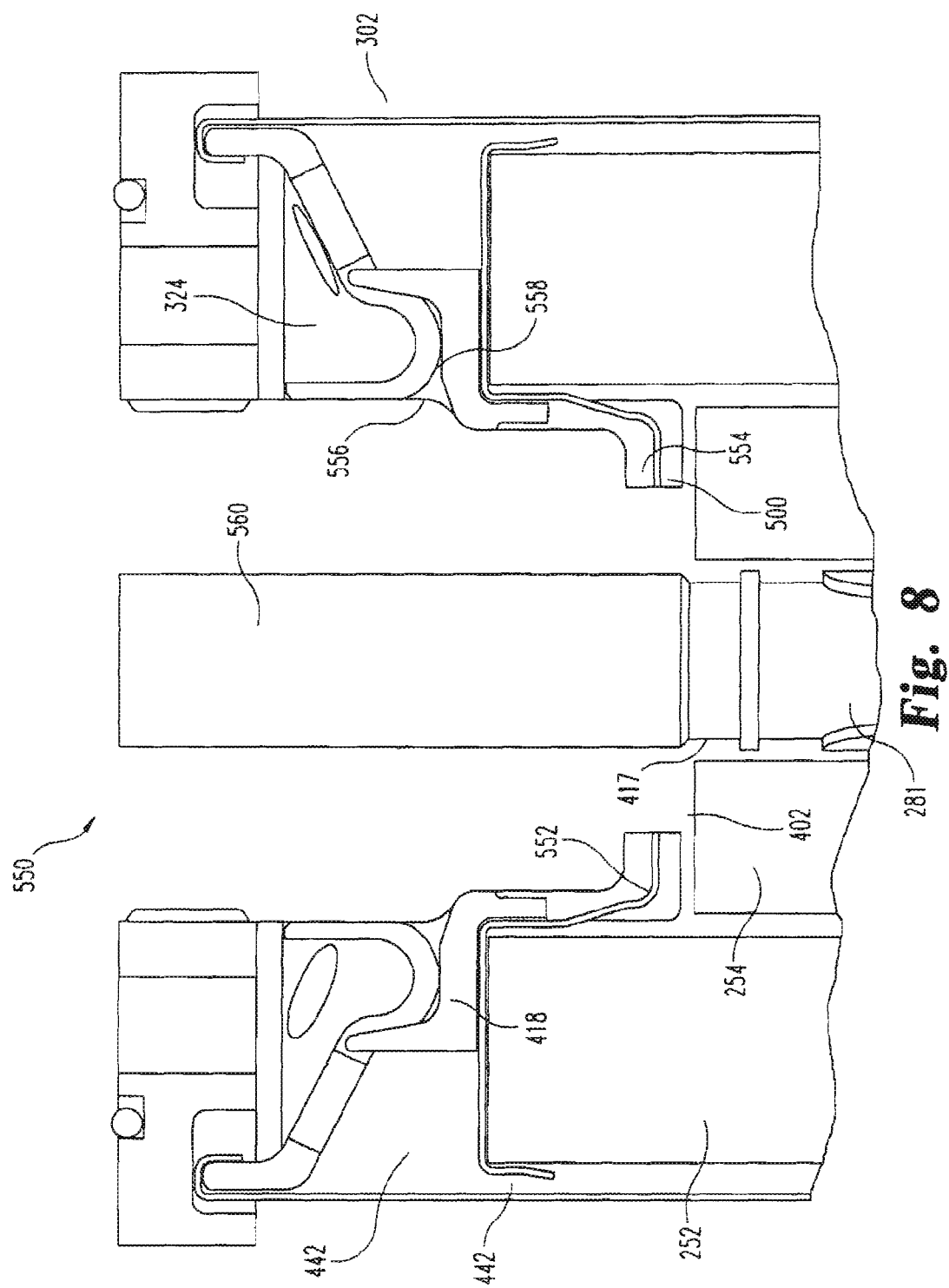
FIG. 8 is a cross-sectional view of a representative filter.

Referring to FIG. 8, a portion of filtering element 250 set forth in FIGS. 6 and 7 is illustrated positioned within a portion of a filter 550. As illustrated, an interior portion 552 of base cap member 402 has been covered with a layer of potting material 554. Potting material 554 creates a fluid tight seal between base cap member 402 and upper cap member 418 of filter 550. A second layer of potting material 556 may be used to seal an inner junction 556 wherein the inner end plate member 418 connects with the lower surface of nutplate 324. A fluid supply tube 560 is illustrated positioned through opening 417 in base cap member 402 and protruding down into fluid chamber 281.

Figure 9:
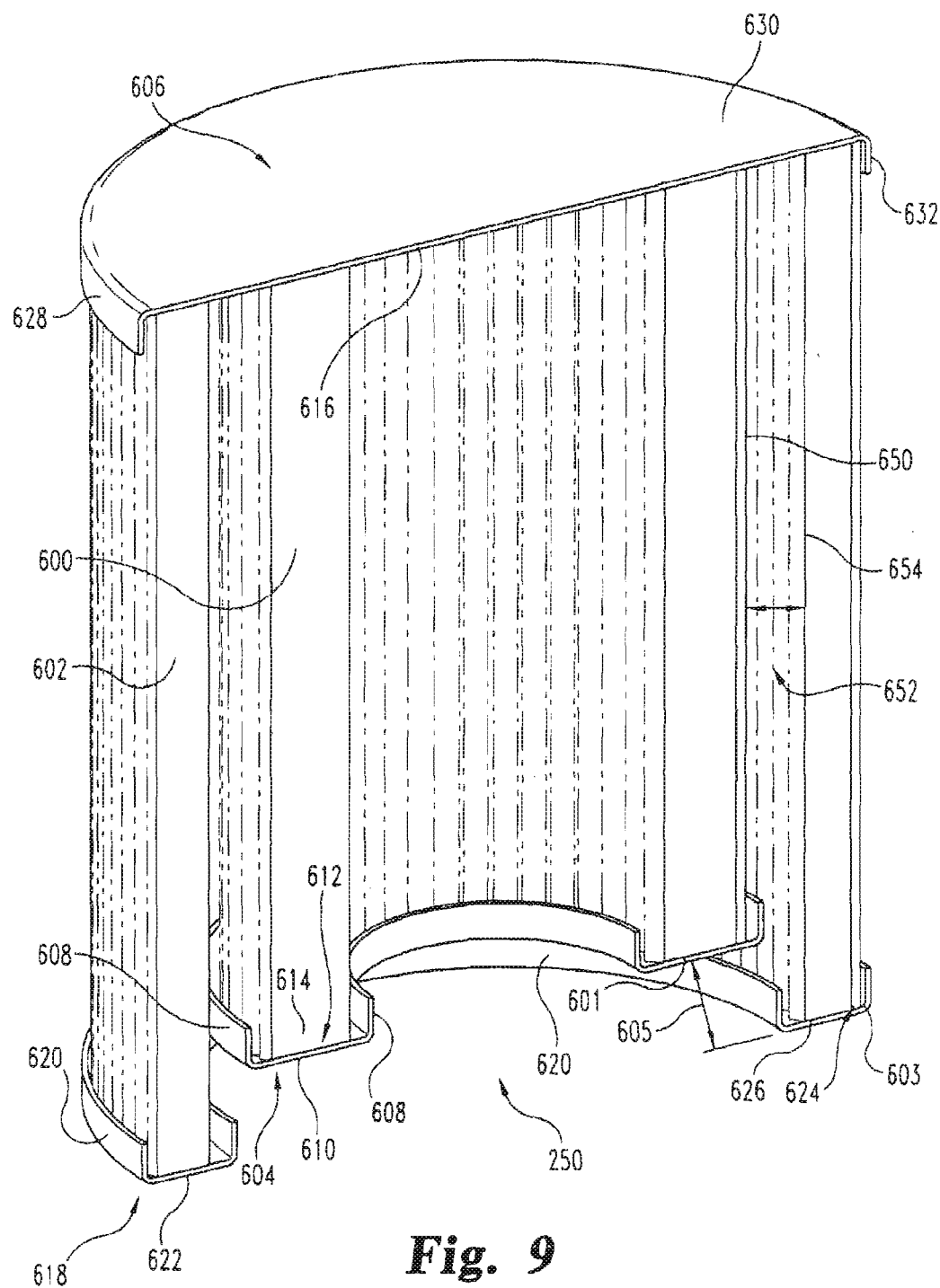
FIG. 9 is a cross-sectional view of another representative filter cartridge.

Referring to FIG. 9, another embodiment of a filtering element 250 is illustrated. Filtering element 250 includes an inner filtering media stage 600 and an outer filtering media stage 602 radially spaced outwardly from inner filtering media stage 600. As previously set forth, outer filter media stage 602 is formed from a material that is capable of coalescing free water and emulsified water contained in a flow of fuel or fluid. Inner filter media stage 600 is formed from a water separating media that is capable of separating water from the flow of fuel so that water does not flow downstream where it is utilized. In addition, outer filter media stage 602 and inner filter media stage 600 are capable of removing or capturing unwanted particulates from the flow of fuel or fluid.

In other forms, inner filter media stage 600 is formed from a material that is capable of coalescing free water and emulsified water contained in a flow of fuel or fluid. As such, both outer filter media stage 602 and inner filter media stage 600 may comprise coalescing filter media. As such, in this form, filter element 250 has two filter stages operable to coalesce water. In another representative form, outer filter media stage 602 includes particulate filter media and inner filter media stage 600 includes coalescing filter media. Inner filter media stage 600 and outer filter media stage 602 also capture unwanted particulates from the flow of fluid or fuel.

Inner filter media stage 600 extends between a first lower end cap 604 and an upper end plate 606. First lower end cap 604 includes a pair of opposing flanges 608 that extend upwardly from a base portion 610 of first lower end cap 604. Flanges 608 and base portion 610 form a U-shaped engagement member 612 that is secured to a lower portion 614 of inner filter media stage 600. Inner filter media stage 600 may be secured in U-shaped engagement member 612 and to a lower surface 616 of upper end plate 606 by several attachment methods including, but not limited to, embedding, potting with adhesive, and sonic or thermal welding. Although U-shaped engagement members 612 are disclosed herein, it is envisioned that engagement members 612 may have other shapes in other embodiments.

Outer filter media stage 602 extends between a second lower end cap 618 and upper end cap 606. Second lower end cap 618 includes a pair of opposing flanges 620 that extend upwardly from a base portion 622 of second lower end cap 618. Flanges 620 and base portion 622 form a U-shaped engagement member 624 that is secured to a lower portion 626 of outer filter media stage 602. Outer filter media stage 602 may be secured in U-shaped engagement member 624 and to lower surface 616 of upper end plate 606 by several attachment methods including, but not limited to, embedding, potting with adhesive, and welding.

Outer filter media stage 602 has a length greater than that of inner filter media stage 600. The difference in lengths forms a gap 605 between a lower surface 601 of inner filter media stage 600 and a lower surface 603 of the outer filter media stage 602. Horizontal or radial gap 652 is present between outer edge 650 of inner filter media stage 600 and an inner edge 654 of outer filter media stage 602. Horizontal gap 652 allows water that has coalesced in outer filter media stage 602 to travel downwardly once the water droplets formed by outer filter media stage 602 exits outer filter media stage 602.

Although not illustrated, filtering element 250 can be positioned in a shell 302 that includes a nutplate 324 similar to that disclosed in previous embodiments. Lower end plate 606 includes a flange 628 that extends upwardly from a base portion 630 of lower end plate 606. A portion of an outer edge 632 of outer filter media stage 602 is connected with flange 628 of lower end plate 606.

Figure 10:
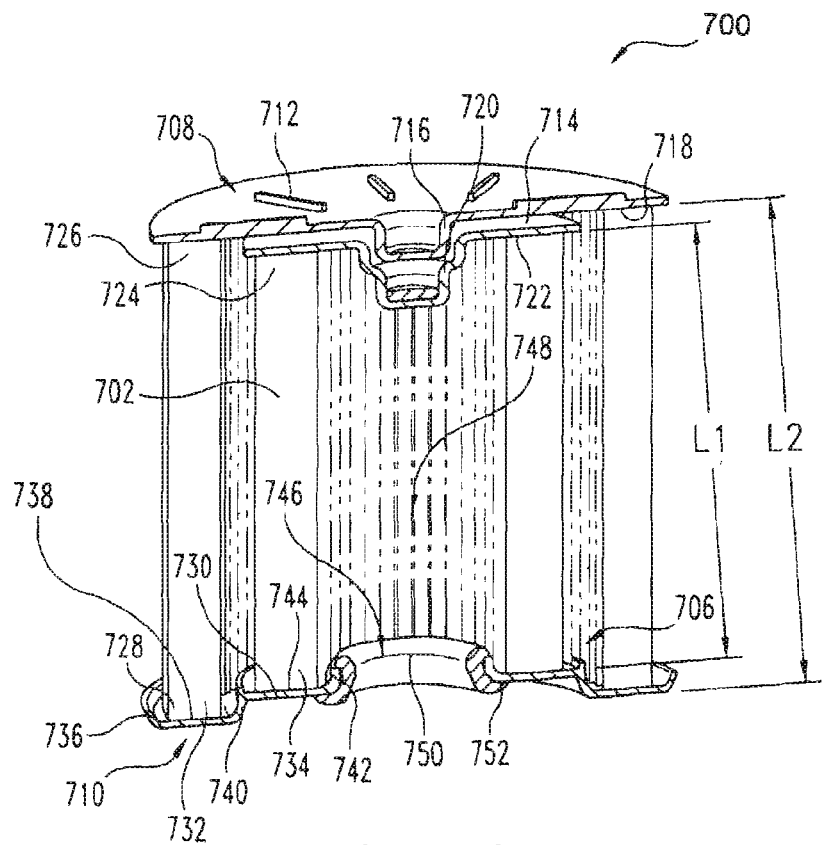
FIG. 10 is a cross-sectional view of another representative filter cartridge.

Referring to FIG. 10, a cross-sectional view of another representative filter element 700 is illustrated. As in the previous embodiments, filter element 700 includes an inner filter media stage 702 and an outer filter media stage 704. Outer filter media stage 704 coalesces water so that the water forms larger water droplets and inner filter media stage 702 separates out any water that remains after leaving outer filter media stage 704. As previously set forth, water droplets that exit fitter media stage 704 travel downwardly toward a lower surface 706 of filter element 700. Any water droplets that do not make it to lower surface area 706 of filter element 700 enter inner filter media stage 702 which removes them from the flow of fuel. In addition, inner filter media stage 702 and outer filter media stage 704 remove unwanted particulates from the flow of fluid.

Filter element 700 includes an upper end plate or cap 708 and a lower end plate or cap 710. Upper end plate 708 comprises an upper cap segment 712 and a lower cap segment 714. Upper cap segment 712 is generally cylindrical in shape and includes a circular shaped male connection member 716 that protrudes downwardly from a lower surface 718 of upper cap segment 712. Lower cap segment 714 is also generally cylindrical in shape and has a smaller diameter than upper cap segment 712. Lower cap segment 714 includes a circular shaped female connection member 720 that protrudes downwardly from a lower surface 722 of lower cap segment 714. Male connection member 716 of upper cap segment 712 is fixedly secured within female connection member 720 of lower cap segment 714.

Upper portion 724 of inner filter media stage 702 is connected with lower surface 718 of upper cap segment 712. An upper portion 726 of outer filter media stage 704 is connected with lower surface 722 of lower cap segment 714. Filter media stages 702, 704 may be connected with upper and lower cap segments 712, 714 in a variety of ways including, but not limited to, embedding, potting with adhesive, or sonic or thermal welding.

Lower end plate 710 may comprise a unitary piece that includes a first U-shaped cradle 728 and a second U-shaped cradle 730. First U-shaped cradle 728 is used to secure a lower portion 732 of outer filter media stage 704 to lower end plate 710. Second U-shaped cradle 728 is used to secure a lower portion 734 of inner filter media stage 702 to lower end plate 710. First U-shaped cradle 728 includes an outer flange 736 that protrudes upwardly from a base portion 738 of lower end plate 710. A second flange 740 protrudes upwardly from approximately the mid-section of lower end plate 710. The first and second U-shaped cradles 728, 730 share second flange 740. Although U-shaped cradles are disclosed herein, other shaped cradles are envisioned.

Third flange 742 protrudes upwardly from a second base portion 744 of second U-shaped cradle 730. Third flange 742 forms an opening 746 in lower end plate 710 such that a fluid transfer tube 560 (for example as shown in FIG. 8) may be inserted into an interior space 748 defined by inner filter media stage 702. Seal 750 is fixedly secured to an outside portion of third flange 742 and a lower portion 752 of second base portion 744. Seal 750 provides a fluid tight seal between filter segment 700 and fluid transfer tube 560.

Figure 11:
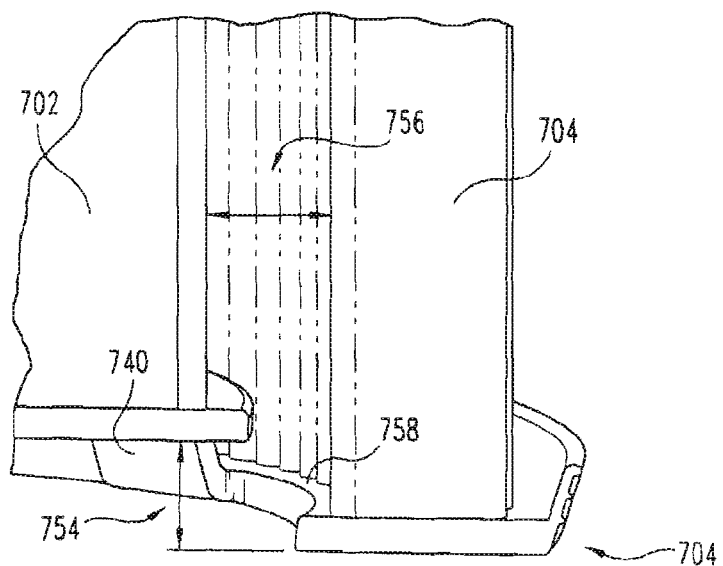
FIG. 11 is a cross-sectional view of a portion of the filter cartridge depicted in FIG. 10.

Referring to FIGS. 10 and 11, to assist in water separation in fluid applications, inner filter media stage 702 has a first length ("L1") and outer filter media stage 704 has a second length ("L2") which is longer than first length L1. The difference between the first length L1 and the second length L2 forms a vertical gap 754 between the bottom of inner filter media stage 702 and the bottom of outer filter media stage 704. A variety of different gap sizes are contemplated. A horizontal space or gap 756 is provided between inner filter media stage 702 and outer filter media stage 704. The second flange 740 of lower end plate 710 may include a plurality of openings 758 that allow water to flow out of the bottom surface of filtering element 700 through lower end plate 710.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fuel filter, comprising:
   a housing for housing a filter element;
   the filter element including:
   an inner filter media stage that defines an inner fluid chamber for filtered fuel,
   an outer filter media stage spaced radially apart from the inner filter media stage, the outer filter media stage having a vertical length longer than that of the inner filter media stage,
   an upper end cap at an upper end of the outer filter media stage, the upper end cap including an outer edge and an inside edge, wherein the outer edge includes a first flange protruding downwardly from the outer edge,
   a lower end cap structure at a lower end of the outer filter media stage,
   an internal segment that extends from the upper end cap to a base portion to form an internal connection chamber, the base portion provided at a top surface of the inner filter media stage, the internal segment including a downwardly extending segment secured to the outside surface of the inner filter media stage and a second flange provided at an inner edge of the base portion, the second flange extending downwardly from the inner edge of the base portion in parallel with an inside surface of the inner filter media stage, wherein the second flange defines an opening leading to the inner fluid chamber,
   wherein the inner filter media stage, the outer filter media stage, the upper end cap, the lower end cap structure, the internal segment and the base portion are configured to prevent fuel passing through the outer filter media stage from bypassing the inner filter media stage so that all of the fuel flows through and is filtered by the inner filter media stage and enters the inner fluid chamber.

2. The fuel filter of claim 1, wherein the filter element further includes a first centertube adjacent to the inside surface of the outer filter media stage and a second centertube adjacent on one side to the inside surface of the inner filter media stage and adjacent on an opposite side to the second flange.

3. The fuel filter of claim 1, wherein the filter element further includes an axial gap formed between the lower portion of the outer filter media stage and a lower portion of the inner filter media stage.

4. A fuel filter, comprising:
   a housing for housing a filter element;
   the filter element including:
   an inner filter media stage that defines an inner fluid chamber for filtered fuel,
   an outer filter media stage spaced radially apart from the inner filter media stage, the outer filter media stage having a vertical length longer than that of the inner filter media stage,
   an upper end cap at an upper end of the outer filter media stage, the upper end cap including an outer edge and an inside edge, wherein the outer edge includes a first flange protruding downwardly from the outer edge,
   an internal segment that extends from the upper end cap to a base portion to form an internal connection chamber, the base portion provided at a top surface of the inner filter media stage, the internal segment including a downwardly extending segment secured to the outside surface of the inner filter media stage and a second flange provided at an inner edge of the base portion, the second flange extending downwardly from the inner edge of the base portion in parallel with an inside surface of the inner filter media stage, wherein the second flange defines an opening leading to the inner fluid chamber, and an upper cap member having an upwardly extending flange, a mid-section, and a downwardly extending flange, where the mid-section is positioned on an upper surface of the upper end cap and the downwardly extending flange is positioned adjacent the inside surface of the outer filter media stage.

5. The fuel filter of claim 4, further comprising a cylindrical seal connected with a lower edge of the downwardly extending flange of the upper cap member.

6. The fuel filter of claim 1, further comprising a nutplate that includes a central threaded segment that protrudes upwardly from a base portion of the nutplate and a wing portion that extends upwardly and outwardly away from the base portion, the wing portion having a plurality of fluid passing apertures located circumferentially around the wing portion.

7. The fuel filter of claim 6, further comprising an external seal connected to an outer upper edge of the housing, the external seal having a downwardly extending segment abutting an inner edge of the nutplate.

8. The fuel filter of claim 1, further comprising a spring engaged with the filter element and positioned within an interior space of the housing.

9. The fuel filter of claim 1, wherein the outer filter media stage is adapted to capture particulates entrained in a flow of fuel, and the inner filter media stage is adapted to capture particulates entrained in the flow of fuel.

10. The fuel filter of claim 1, wherein the housing is generally cylindrical, with an opening at one end of the housing.

11. The fuel filter of claim 1, wherein the lower end cap structure includes a lower base portion secured to a lower portion of the outer filter media stage, the lower base portion having an outer flange that protrudes from an outer edge of the lower end cap.

12. The fuel filter of claim 1, wherein the lower end cap structure includes an upper base portion secured to a lower portion of the inner filter media stage, the upper base portion having a second outer flange that protrudes from an outer edge of the upper base portion.

13. The fuel filter of claim 1, wherein the lower end cap structure includes:
a first lower end cap positioned at a second end of the outer filter media stage and a second lower end cap positioned at a second end of the inner filter media stage,
the first lower end cap including a lower base portion secured to a lower portion of the outer filter media stage, the lower base portion having an outer flange that protrudes from an outer edge of the first lower end cap, and
the second lower end cap including an upper base portion secured to a lower portion of the inner filter media stage, the upper base portion having a second outer flange that protrudes from an outer edge of the upper base portion.

14. A filter element, comprising:
an inner filter media stage that defines an inner fluid chamber for filtered fuel,
an outer filter media stage spaced radially apart from the inner filter media stage, the outer filter media stage having a vertical length longer than that of the inner filter media stage;
an upper end cap and a lower end cap at opposing ends of the outer filter media stage, the upper end cap including an outer edge and an inside edge, wherein the outer edge includes a first flange protruding downwardly from the outer edge;
an internal segment that extends from the upper end cap to a base portion to form an internal connection chamber, the base portion provided at a top surface of the inner filter media stage, the internal segment including a downwardly extending segment secured to the outside surface of the inner filter media stage and a second flange provided at an inner edge of the base portion, the second flange extending downwardly from the inner edge of the base portion in parallel with an inside surface of the inner filter media stage, wherein the second flange defines an opening leading to the inner fluid chamber,
wherein the inner filter media stage, the outer filter media stage, the upper end cap, the lower end cap, the internal segment and the base portion are configured to prevent fuel passing through the outer filter media stage from bypassing the inner filter media stage so that all of the fuel flows through and is filtered by the inner filter media stage before entering the inner fluid chamber.

15. The filter element of claim 14, further including an axial gap formed between a lower portion of the outer filter media stage and a lower portion of the inner filter media stage.

16. The filter element of claim 14, further comprising a first centertube adjacent to the inside surface of the outer filter media stage and a second centertube adjacent on one side to the inside surface of the inner filter media stage and adjacent on an opposite side to the second flange.

* * * * *